(12) United States Patent
Kadari et al.

(10) Patent No.: US 10,075,678 B2
(45) Date of Patent: Sep. 11, 2018

(54) VIDEO DISTRIBUTION AND STORAGE UNIT

(71) Applicant: The United States of America as represented by the Administrator of the National Aeronautics and Space Administration, Washington, DC (US)

(72) Inventors: Madhusudhan Kadari, Laurel, MD (US); Sergey Svoysky, Germantown, MD (US); Seshagiri Nadendla, Huntingtown, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/432,469

(22) Filed: Feb. 14, 2017

(65) Prior Publication Data
US 2018/0234664 A1    Aug. 16, 2018

(51) Int. Cl.
| | |
|---|---|
| *H04N 7/20* | (2006.01) |
| *B64G 1/00* | (2006.01) |
| *H04N 7/18* | (2006.01) |
| *H04N 21/61* | (2011.01) |
| *H04N 21/4223* | (2011.01) |
| *H04N 19/426* | (2014.01) |

(52) U.S. Cl.
CPC .......... *H04N 7/181* (2013.01); *H04N 19/426* (2014.11); *H04N 21/4223* (2013.01); *H04N 21/6143* (2013.01)

(58) Field of Classification Search
CPC .. H04B 7/1851; H04B 7/185; H04B 7/18578; B64G 1/36
See application file for complete search history.

(56) References Cited

U.S. PATENT DOCUMENTS

| | | | | |
|---|---|---|---|---|
| 5,518,209 | A * | 5/1996 | Chicoine | B64G 1/10 244/159.4 |
| 6,027,077 | A * | 2/2000 | Eller | B64G 1/22 244/171.8 |
| 7,270,302 | B1 * | 9/2007 | Wong | B64G 1/50 244/171.8 |
| 7,513,462 | B1 * | 4/2009 | McKinnon | B64G 1/1007 244/173.1 |
| 8,888,050 | B1 * | 11/2014 | Murphy | B64G 1/002 244/173.3 |

\* cited by examiner

*Primary Examiner* — Fred Peng
(74) *Attorney, Agent, or Firm* — Matthew F. Johnston; Bryan A. Geurts; Mark P. Dvorscak

(57) ABSTRACT

Disclosed is a satellite payload device, including a plurality of sensors configured to detect images of a satellite, a video distribution and storage unit configured to collect, compress, store, and transmit the images, and a control computer configured to request a portion of the plurality of sensors from which to receive sensor data that is routed to the video distribution and storage unit.

9 Claims, 4 Drawing Sheets

VIDEO DISTRIBUTION AND STORAGE UNIT

TECHNICAL FIELD

Various exemplary embodiments disclosed herein relate to a video distribution and storage unit used in satellite applications.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various exemplary embodiments are related to a satellite payload device including a plurality of sensors configured to detect images of a satellite, a video distribution and storage unit (VDSU) configured to collect, compress, store, and transmit the images, and a control computer configured to request a portion of the plurality of sensors from which to receive sensor data that is routed to the VDSU.

The VDSU may be configured to receive four video channels at a given time from four separate sensors. The VDSU may be configured to receive eight video channels at a given time from eight separate sensors. The VDSU may configured to receive twelve video channels at a given time from twelve separate sensors.

The VDSU may include at least one compression and storage module (CSM) configured to compress six video streams at a given time. The CSM may include six compression engines.

The VDSU may include two compression and storage modules configured to compress twelve video streams at a given time.

The satellite payload device may include two compression and storage modules connected via a high speed data link.

The plurality of sensors may include wide field sensors, narrow field sensors, and situational awareness cameras.

The plurality of sensors may include at least a camera placed on a robot arm of the payload device.

The VDSU may include redundant compression and storage modules, and redundant power modules.

The satellite payload device may be mounted to a spacecraft configured to service satellites.

Various exemplary embodiments are also related to a video distribution and storage unit (VDSU) of a satellite payload device, including a housing having slots and configured to hold a plurality of module boards, a plurality of power modules (VPMs) configured to provide power to the video distribution and storage unit, a plurality of sensor interface modules (SIMs) configured to collect video data from a plurality of sensors, and a plurality of compression and storage modules (CSMs) configured to compress, store, and transmit images collected from at least one of the plurality of SIMs.

The housing may include a first side and a second side, wherein one CSM operates in a primary mode on the first side and the another CSM operates in a backup mode on the second side.

In the primary mode on the first side, one of the plurality of VPMs, the plurality of SIMs, and two of the plurality of CSMs may be in operation together and in the backup mode on the second side, another of the plurality of VPMs, the plurality of SIMs and another two of the plurality of CSMs are in operation together.

The plurality of VPMs, the plurality of SIMs, and the plurality of CSMs may be arranged in the housing according to the heat dissipation of each board.

An active VPM may be positioned three slots away from an active CSM.

A first active CSM may be positioned three slots away from a second active CSM.

The VDSU may be configured to receive eight video channels at a given time from eight separate sensors.

The VDSU may include two CSMs configured to compress twelve video streams at a given time.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
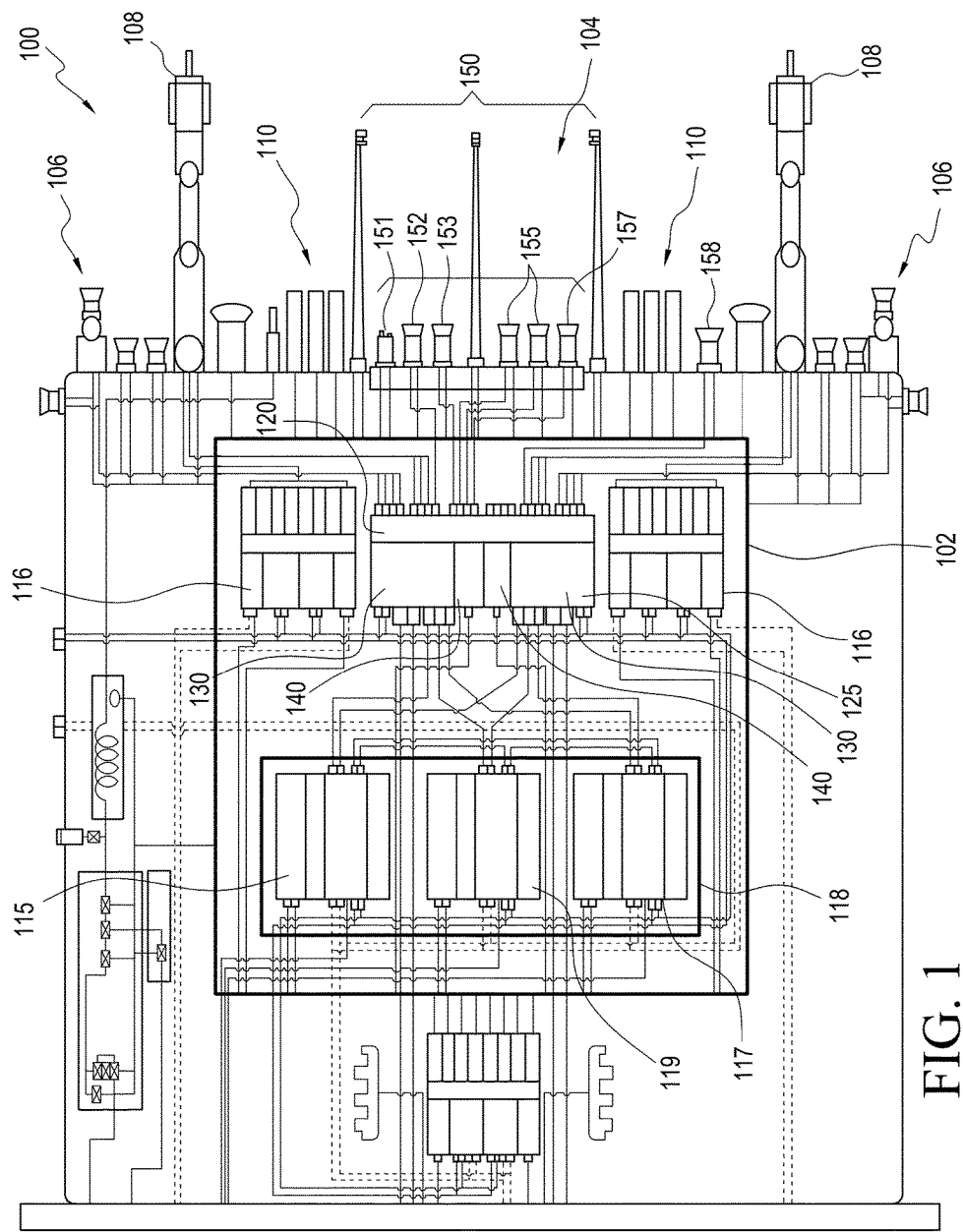
FIG. 1 illustrates subsystems and components of a restore servicing payload (RSP) configured to service a satellite in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. Descriptors such as "first," "second," "third," etc., are not meant to limit the order of elements discussed, are used to distinguish one element from the next, and are generally interchangeable.

Embodiments described herein are part of systems and modules to provide satellite-servicing capability to satellites located in low earth (LEO), geosynchronous (GEO) orbits and from 0.5 AU to 2.0 AU environments. Embodiments may be used in other space related rendezvous and proximity operations robotic tasking, such as asteroid retrieval missions.

Embodiments described herein include a comprehensive system implementing at least ten different systems into one. Systems and modules may include a restore servicing vehicle (RSV) and a ground element. The RSV is further divided into a first support subsystem known as a spacecraft bus and a second support subsystem that is responsible for providing core functionality, known as a payload. As discussed herein, a restore servicing payload (RSP). As discussed herein, the RSP is a module attached to RSV communications circuitry that operates independently of the main spacecraft but which shares the RSV's power supply and transponders.

FIG. 1 illustrates subsystems and components of a RSP 100 configured to service a satellite in accordance with embodiments described herein. An RSP 100 includes avionics 102, rendezvous and proximity operations (RPO) 104, vision sensors 106, robot arms 108, tools and tool drive 110, and other components such a propellant transfer, mechanical apparatuses, and hybrid flight computing subsystems.

Within avionics 102 are dual robotics electronic units (REU) 116, a tripartite payload control computer (PCC) 118 and the video distribution and storage unit (VDSU) 125. The VDSU 125 interfaces to the sensors in the system and routes, compresses, and stores the sensor image data. As discussed herein, sensors include cameras, tools, temperature sensors, touch sensors, and other sensors to detect a satellite from a moving spacecraft as known to those skilled in the art.

The VDSU 125 is a comprehensive, high performance, high density, and complete system. Data obtained from the VDSU 125 may be recorded, stored, transmitted, and played back to operators at a ground station. The VDSU 125 includes sensors to capture data, modules to interface with the sensors, compression engines to compress and store the captured data, and power systems to provide power for these systems and operations. The VDSU 125 includes a number of redundant and fail safe systems to protect data and to allow constant monitoring and communications to be maintained with a ground station.

The VDSU 125 is a low power apparatus, having a low mass and weight. The weight of the total RSP may be kept under thirty-five pounds. Cost is kept at a minimum while including a high density of components in a package configured to produce high performance. In embodiments described herein, the number of devices in the VDSU 125 supported is very large compared to previous devices. The VDSU 125 may implement and support up to twenty-four or more sensors and cameras, and can store on an order of 128 gigabytes of data. Components of the VDSU 125 can compress up to twelve or more simultaneous streams of data, and on an order of twenty-four total. A VDSU 125 downlink may feed a single high data rate stream of up to six cameras into a downlink to ground. All of these features have been configured into a compact, low power, lightweight, powerful system as described herein.

The PCC 118 of the RSP 100 may receive instructions or commands from a ground station regarding which sensors or cameras to activate or put into use. These commands are routed through the VDSU 125 of the avionics 102 to the sensors being targeted. The sensors are then turned on and begin to capture and send back video. The VDSU 125 of the avionics 102 may accept all RSP video and high-speed data from the RSP sensors. The VDSU 125 routes, stores, and compresses the data. The VDSU 125 also routes commands from the PCC 118 to the various payload sensors.

Routed high-speed data can be selectively sent from VDSU 125 to the PCC 118 as well as to a spacecraft bus (not illustrated) for transmission to the ground. Additionally, processed data from the PCC 118 can be routed to the spacecraft bus for transmission to the ground. Embodiments described herein combine many functions into one convenient and compact system.

FIG. 1 illustrates connections between the VDSU 125 and other entities within the RSP 100. The VDSU 125 interfaces to all the cameras, sensors, and tools of the RSP 100, including wide field sensors (WPOV) 155 and narrow field sensors (NPOV) 157. The RSP includes situational awareness (SA) cameras positioned at corners of the RSP 100. The SA cameras maybe part of vision cameras 106 that are configured to capture what is happening around the system, and which send that data to the VDSU 125 for processing and routing. There may be eight situational awareness cameras positioned on the corners of the RSP 100 to help direct the payload once it approaches a satellite.

Embodiments described herein include modules and components to visit and service different types of satellites. In a first operation, after an RSV is mounted to a spacecraft and launched, the RSV may get close to a satellite in order to capture it. An RSP 100 may be connected to a spacecraft bus and loaded onto a rocket. Once the rocket is launched and in orbit, the bus takes over. The bus handles the journey to about 10 km close to a satellite.

The RSP 100 may include a berthing vision system 150 including six cameras that make up the RPO 104, including LRF camera 151, LIDAR 152, and infrared (IR) camera 153. The RPO 104 may also include wide point of view (WPOV) cameras 155 and narrow point of view (NPOV) camera 157. Using the RPO 104, robotic tool control features are analyzed and processed. The RSP 100 may be used to service a satellite. Long range cameras such as WPOVs 155 and lasers are used. As the spacecraft approaches the satellite, SA cameras 106 and NPOV 157 sensors are used. The RSP 100 may include an inspection camera 158 with zoom lens. The tool drives 110 each may have a sensor or camera to allow a correct tool to be selected for use.

The RSP 100 entities will be turned on and take over and get close, capture the satellite, and service it through robotic arms 108. Robotic controls from a ground station can be used. Service functions can include repair, opening and closing a wall to refuel, refueling, activating various instruments, etc. Once the mission is complete, the satellite can be released and placed back into orbit, and the RSP 100 can move on to the next satellite. Components such as the tool drives 110 and robotic arms 108 may communicate over four channels of an advanced tool drive system (ATDS). A test system may include another four channels used by the VDSU 125.

The robotic arms 108 of the RSP 100 may hold, alter, or adjust a satellite. The robotic arms 108 may be controlled from the ground or according to pre-established programs. When an RSP 100 attempts to obtain or capture a satellite, various of the camera sensors may be used to detect certain aspects of the outer configuration the satellite, store this information, or send it to a ground station (not illustrated). The VDSU 125 may communicate with all the sensors of the RSP 100.

The robotic arms may have cameras attached to ends thereof. As the RSP approaches a satellite, and as maneuvers are made to get into position, various cameras and sensors are used to obtain location and orientation information for a ground crew to direct the actions of the RSP. If, on capturing the satellite, there are protective layers or other obstacles, a camera on the end of the robotic arm 108 may enable an operator to cut through a protective layer, or open a fuel hatch with accuracy. For each function to be performed there is a different tool that the robotic arm 108 may use, and the camera on the robotic arm 108 may provide video feeds of what is happening in the tool itself. The robotic arms 108 may use tools as are known to those skilled in the art to access various compartments of a satellite.

Other systems supported by the VDSU are 4 channels of Integration and Test, and a tool drive subsystem. The VDSU 125 may interface to all the sensors, including camera sensors, robotic arms, tools, and test devices, to obtain data and route the data to the PCC 118. The PCC 118 may ask for data from a specific sensor or sensors. The VDSU 125 interfaces with the sensor, communicates with it, obtains the data, compresses it, processes it, and sends it to the PCC 118. The PCC 118 may include its own power supply 115, redundant spacecube processors 119, and I/O interfaces 117.

The VDSU 125 includes compression and storage modules (CSMs) 130, sensor interfaces 120, and power supplies 140. The CSMs 130 may compress data from lossless to a factor of 100 using a JPEG2000 compression component or other compression schemes. The VDSU may access up to twenty-four or more data streams from the twenty-four sensors and may compress up to twelve at a time. The compressed data may be stored in the VDSU 125 in a CSM 130. The RSP 100 includes onboard memory and flash memory. After the information is received in the VDSU 125, it may be stored for any length of time, or also sent to a ground station.

For the various types of sensors described herein, the PCC 118 can select any of the sensors to collect data therefrom and to be routed through the VDSU 125. The data may then be sent to the PCC 118, or compression may be performed on the data within a CSM 130, or transmitted to ground over a high speed downlink. Either compressed or non-compressed data may be sent to the PCCs 118. The CSMs 130 may have a compression mode and a passthrough mode for data received from sensors.

Figure 2:
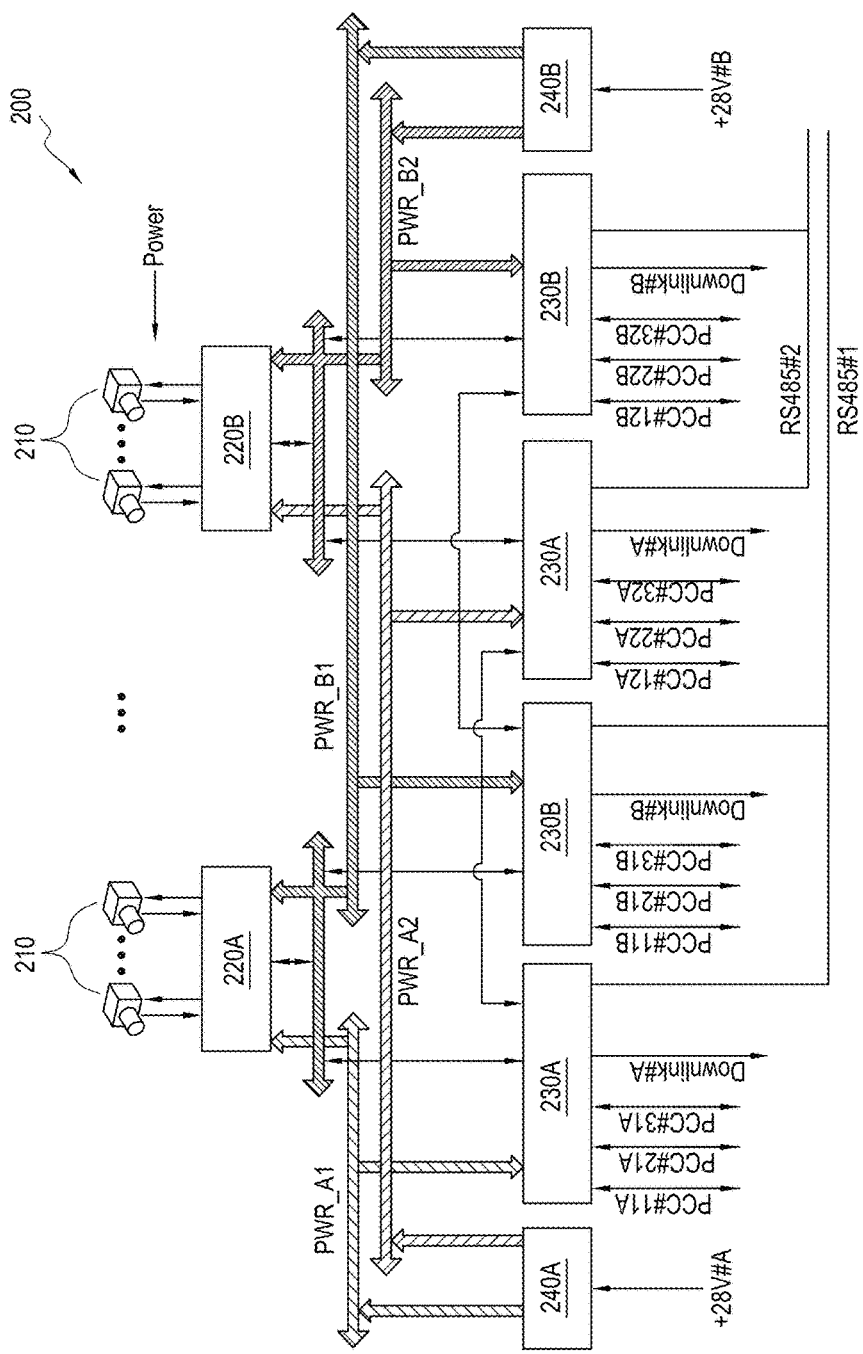
FIG. 2 illustrates video distribution and storage unit (VDSU) architecture block diagram in accordance with embodiments described herein.

FIG. 2 illustrates a block diagram of a VDSU 200 in accordance with embodiments described herein. The VDSU 200 may receive, compress, store, and route video data received from sensors 210. The initial interface modules of the VDSU 200 are sensor interface modules (SIMs) SIM 220A and SIM 220B. The SIM 220A and SIM 220B connect on one side to the various sensors 210 capturing video data and on the other side to power and data connections. Each SIM 220A and SIM 220B receives separate power from VDSU power modules (VPMs) 240A and 240B. As described herein, the VDSU 200 includes both an A side and a redundant B side in the case one or more components of the A side fails. One of the side A or side B modes may be designated a primary mode and the other a backup mode. The SIMs 220A and 220B are always powered on to enable video data to be available and captured from twenty-four of the RSP 100 sensors at any time. The VPMs may receive a high voltage from external circuitry and step down or transform a received voltage to a lower voltage usable by either the SIM 220A and SIM 220B or CSMs 230A and 230B.

The VDSU 200 includes four CSM modules, a pair of 230A modules and a pair of 230B modules. Each CSM module may receive, compress, and store data from up to six or more video sensors at a time. Two of the pairs of CSM modules, for example the pair 230A and 230A may be in operation at a time, for a total of twelve possible active video links in one transmission to be received, compressed, stored, or transmitted to the PCC. Because both pairs of CSM modules 230A and 230B are connected via the SIMs 220A and 220B to all of the sensors 210, in a next transmission, the pair of CSM 230A modules receive up to twelve streams from another group of sensors 210, if all the sensors are in operation at a time. However, because of far proximity, near proximity, and tactile sensors of the robot arms 108, such a possibility is unlikely.

As illustrated in FIGS. 1 and 2, one of the features of the VDSU 125 is redundancy. As illustrated in FIG. 2, the VDSU 200 includes several layers of communication. The VDSU 200 includes redundant pairs of CSM modules 230A and 230B including a side A and a side B. If the system determines a reason to switch from a side A to B, or from B to A, the PCC 118 may run diagnostics and tests on the non-performing side to determine what, if any, problems have occurred, and whether any modules can be reconfigured to have the side back working again.

The CSM modules 230A and 230B may receive a plurality of signals and commands from the PCC and route these messages to the SIMs 220A and 220B, which in turn activate various sensors 210 to begin capturing images. Signals and commands from the PCC may be uplinked, such as over a V2P link from PCC to CSMs 230A and 230B. CSMs 230A and 230B receiving data from a SIM 220A or 220B may in turn downlink messages to a PCC.

Figure 3:
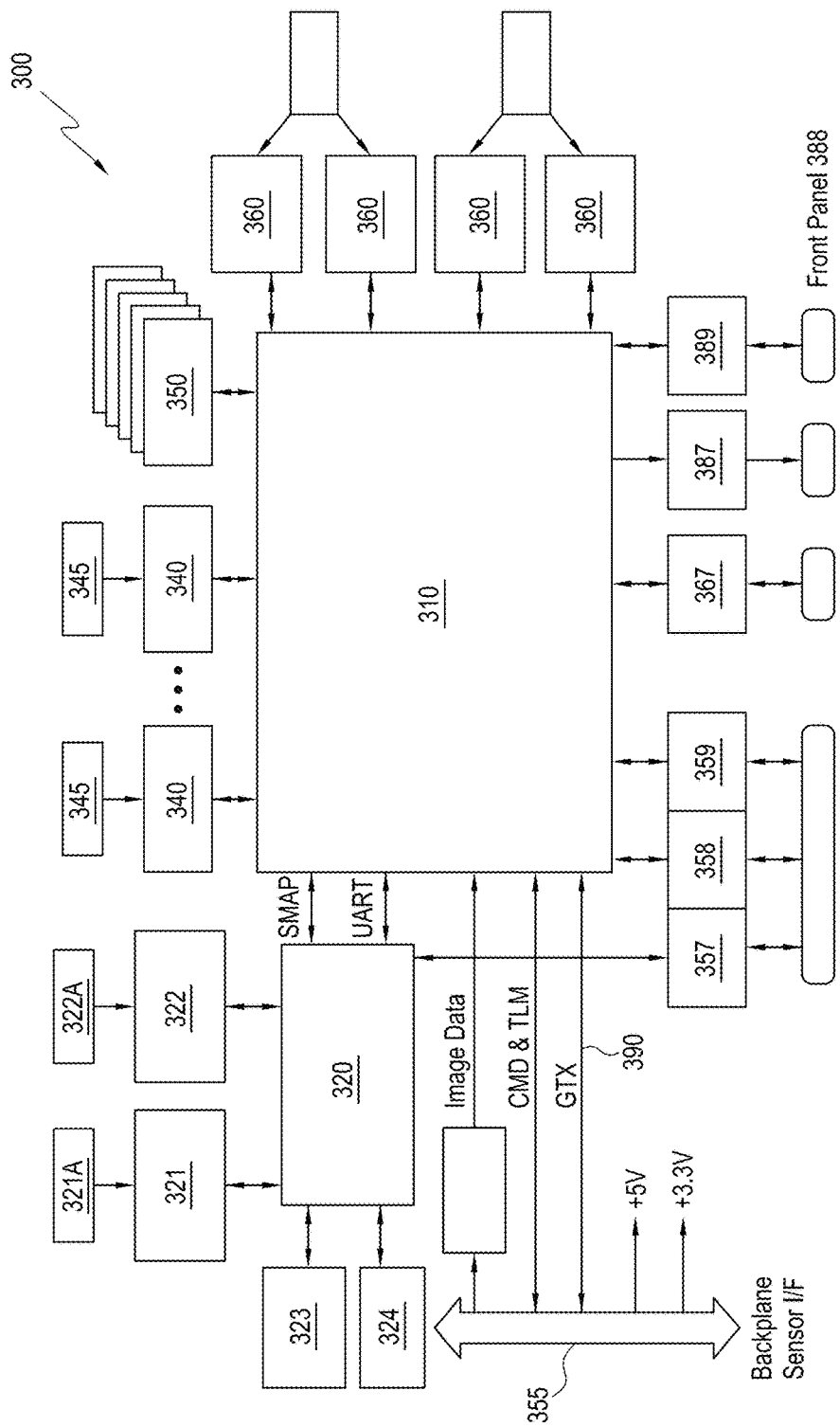
FIG. 3 illustrates a block diagram of a compression and storage module (CSM) and circuit components thereof in accordance with FIG. 2

FIG. 3 illustrates a block diagram of a compression and storage module (CSM) 300 and circuit components thereof in accordance with FIG. 2. The CSM 300 of FIG. 3 may correspond to any of the pairs of CSM modules 230A and 230B illustrated in FIG. 2. The CSM 300 may include a rad hard high performance field programmable gate array (FPGA) 310 such as space-grade V5-FX130 manufactured by Xlinx. The FPGA 310 and other components of the CSM 300 may be controlled by a processor 320. Processor 320 may also be a rad hard circuit, such as a highly integrated, high-performance 32-bit RISC embedded processor AT697F by Atmel. At power up, the processor 320 configures the FPGA 310 and then monitors it. If any radiation or high energy particles upset the FPGA 310, the processor 320 monitors the FPGA 310 and if it finds something wrong, such as corruption of data or of the firmware, the processor 320 may reconfigure the FPGA 310 including reloading the software and data. Processor 320 may make use MRAM memory 323 to store code and static ram 324. Processor 320 may communicate with a front panel 388 via an RS422 universal asynchronous receiver/transmitter that may convert parallel data from processor 320 into a serial data stream. FPGA 310 may likewise communicate with the front panel 388 via RS422 interface 359 and with other interfaces including JTAG serial interface 358 and RS485 serial interface 389.

Working with the processor 320 are two NAND flash memory blocks 321 and 322. One of the NAND memory blocks 321 may be a working memory. A second NAND block 322 may be a gold copy that stores a copy of all the FPGA 310 software and hardware information. The gold copy 322 never gets overwritten and is used as a fallback condition if something should happen to the working memory 321. Working memory 321 may have a dedicated power supply 321A. Gold memory 322 may have a dedicated power supply 322A.

The CSM 300 includes six compression engines 340 used for video and high bandwidth image compression applications having enhanced quality and features of the high performance JPEG2000 image compression standard. The compression engine may be a chip such as the ADV212 made by Analog Devices. The compression engines 340 operate independently from the rest of the CSM 300 that are powered from the same sources with the compression engines 340 having their own power sources 345. If radiation or high energy irradiates a bank of compression engines 340 and strikes one of them, damage is limited to one channel only. Thus the compression engines 340 include six independent compression channels.

In operation, the compression engines 340 receive sensor data via a backplane interface 355 of the RSP assembly. The sensor data may pass through the backplane interface 355 into the FPGA 310, which routes captured images and video into the compressions engines 340 for compression. The compressed data gets sent back to the FPGA 310, where it can be stored in NAND Flash memory 360, sent to the PCC via a VDSU to PCC (V2P) link 367, or to a ground station via a downlink 387. FPGA may make use of a double data rate DRAM 350 on the order of 72 boards having 64 mega bytes of memory each.

The CSM 300 of FIG. 3 represents one of the A side or B side CSMs. At any one time, the RSP 100 has twelve data compression channels in operation, and on the order of twenty-four compression possible channels.

The CSM 300 includes two independently powered NAND flash banks to store the information of FPGA 310. Two NAND flash banks 380 and 385 each have their own power control. In case of an accident, half of the memory is always available. Once data is stored in the NAND flash banks 360, it can be retrieved by a ground station at any time.

CSM 300 also includes a high speed communication line 390 that connects one CSM to another. Thus two CSMs may be connected when side A is in operation, and another two CSMs may be connected to process up to twelve video streams when side B is in operation. In operation, the PCC requests what data it wants from each sensor, using the CSMs and SIMs to transfer requests and to obtain the data in return. Each SIM corresponds to 12 sensors of the RSV. The PCC can select any of the sensors, irrespective to which V2P the CSM is connected.

Previous systems are limited by fixed, scripted programming. Embodiments described herein include upgradeable and reprogrammable components including the FPGA 310. Operators at a ground site may uplink programs to the FPGA 310 to perform new functions and additional processing, uplinking data and programs when the system is in orbit. For example, upgrades may include different processing of a camera interface. Or, in an attempt to recognize a satellite that has different features than those supported by existing programs, a new program could be uploaded to recognize additional features of a different satellite in order to recognize and lock onto the second satellite. Alternatively, an algorithm of feature recalculation may be changed. Software may be upgraded, and also firmware and hardware at the FPGA 310 level.

Figure 4A:
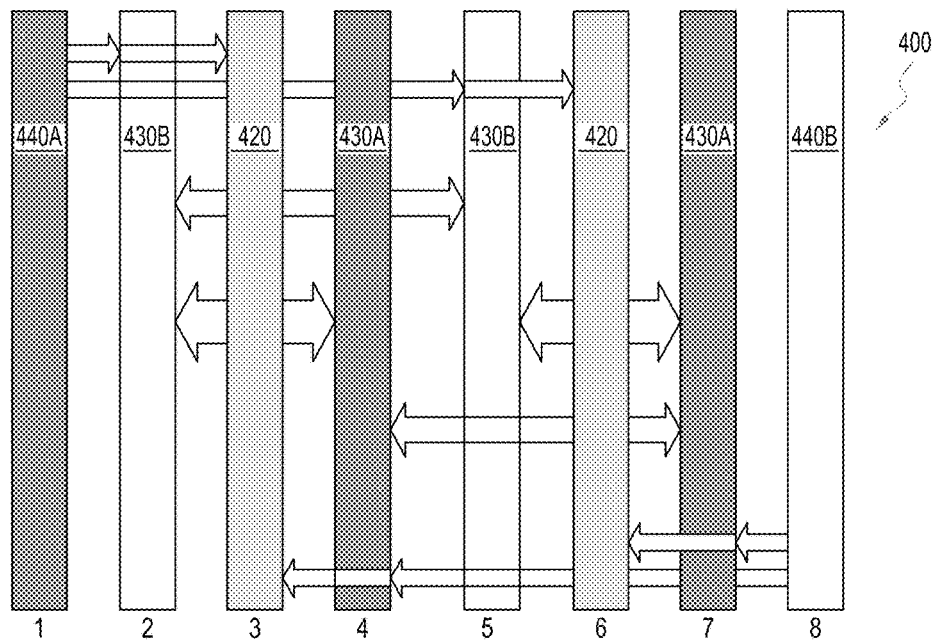
FIGS. 4A and 4B illustrate thermal distribution schemes of VDSU components in accordance with embodiments described herein.
Figure 4B:
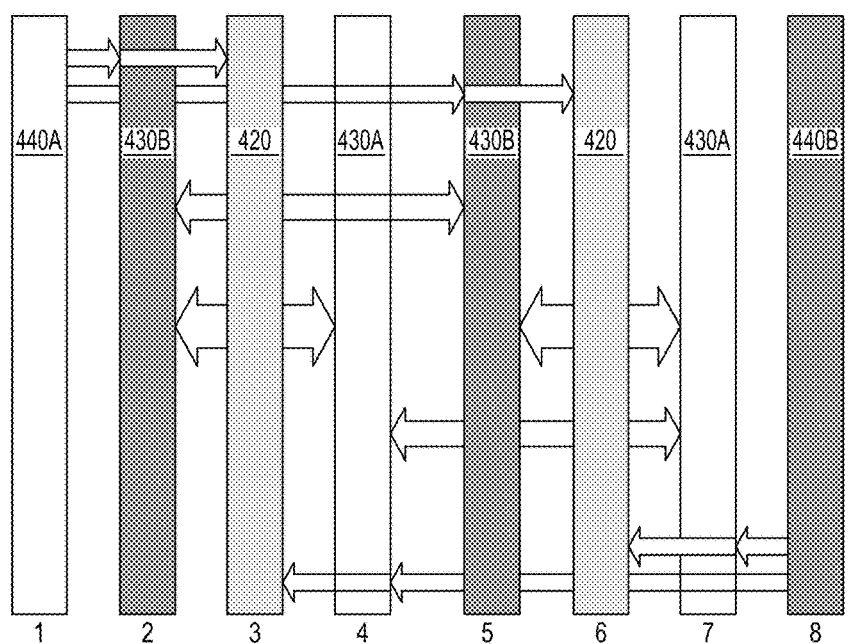

FIGS. 4A and 4B illustrate thermal distribution schemes of VDSU components in accordance with embodiments described herein. A VDSU assembly 400 includes eight subsystems that may be housed on separate boards in a housing, each board being either a SIM 420, CSM 430A or 430B, or VPM 440A or 440B. To support the redundancy of the system and the power requirements, two power supply VPM boards 440A and 440B are used, board 440A for a first side A and board 440B for a second side B. VPM 440A and 440B boards emit an amount of heat, a typical output of about 18 W to a maximum of 24 W during operation. At a given time, only one of the VPM boards 440A or 440B is in use, depending on which side A or B is also in use.

A VDSU assembly 400 will include four CSM boards including two 430A boards, and two 430B boards, only an A or B pair in use at a given time. The CSM boards 430A and 430B emit a similar amount of heat as to the VPM boards 440A and B, the CSM boards emitting 17.5 W at a typical usage, and 25 W at maximum output. Because of these similar power emissions, embodiments described herein place VPM boards 440A and 440B three slots away from CSM boards 430A and 430B. As illustrated in FIG. 4A, when VPM board 440A for side A is active (shown in a darkened state), the nearest active CSM board 430A for side A is placed three slots away in slot 4, with two intervening boards. The second CSM board 430B is positioned in the seventh slot, directly adjacent an inactive VPM board 440B. A similar arrangement is illustrated in FIG. 4B in which active VPM and CSM boards are positioned in slots two, five, and eight respectively. The numbering scheme is for merely for convention. Slot numbers could start from the right or be designated by other numerals, characters, letters, etc.

As illustrated in FIG. 4, the SIM boards 420 are colored lighter, signifying that these boards emit the lowest power in the VDSU assembly 400. A typical power measurement for a SIM board 420 may be on the order of 2.5 W per board, with a maximum power dissipation on the order of 3 W. These SIM boards 420 may be positioned directly adjacent an active CSM board 430A and an inactive CSM board 430B, in order to limit the amount of heat dissipated from a given region. The arrangement of the backplane is designed to correspond to the layout illustrated in FIGS. 4A and 4B.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A video distribution and storage unit (VDSU) of a satellite payload device, comprising:
   a housing having slots and configured to hold a plurality of module boards;
   a plurality of power modules (VPMs) configured to provide power to the video distribution and storage unit;
   a plurality of sensor interface modules (SIMs) configured to collect video data from a plurality of sensors; and
   a plurality of compression and storage modules (CSMs) configured to compress, store, and transmit images collected from at least one of the plurality of SIMs,
   wherein the plurality of VPMs, the plurality of SIMs, and the plurality of CSMs are arranged in the housing according to the heat dissipation of each board.

2. The VDSU of claim 1, wherein the housing includes a first side and a second side, wherein one CSM operates in a primary mode on the first side and another CSM operates in a backup mode on the second side.

3. The VDSU of claim 2, wherein in the primary mode on the first side, one of the plurality of VPMs, the plurality of SIMs, and two of the plurality of CSMs are in operation together and in the backup mode on the second side, another of the plurality of VPMs, the plurality of SIMs and another two of the plurality of CSMs are in operation together.

4. The VDSU of claim 3, wherein an active VPM is positioned three slots away from an active CSM.

5. The VDSU of claim 3, wherein a first active CSM is positioned three slots away from a second active CSM.

6. The VDSU of claim 1, wherein the VDSU is configured to receive eight video channels at a given time from eight separate sensors.

7. The VDSU of claim 1, wherein the VDSU includes two CSMs configured to compress twelve video streams at a time.

8. The VDSU of claim 1, wherein the VDSU is part of a satellite payload device that is mounted to a spacecraft configured to service satellites.

9. The VDSU of claim 1, wherein the SIMs receive sensor images wide field sensors, narrow field sensors, and situational awareness cameras.

* * * * *